No. 794,068. Patented July 4, 1905.

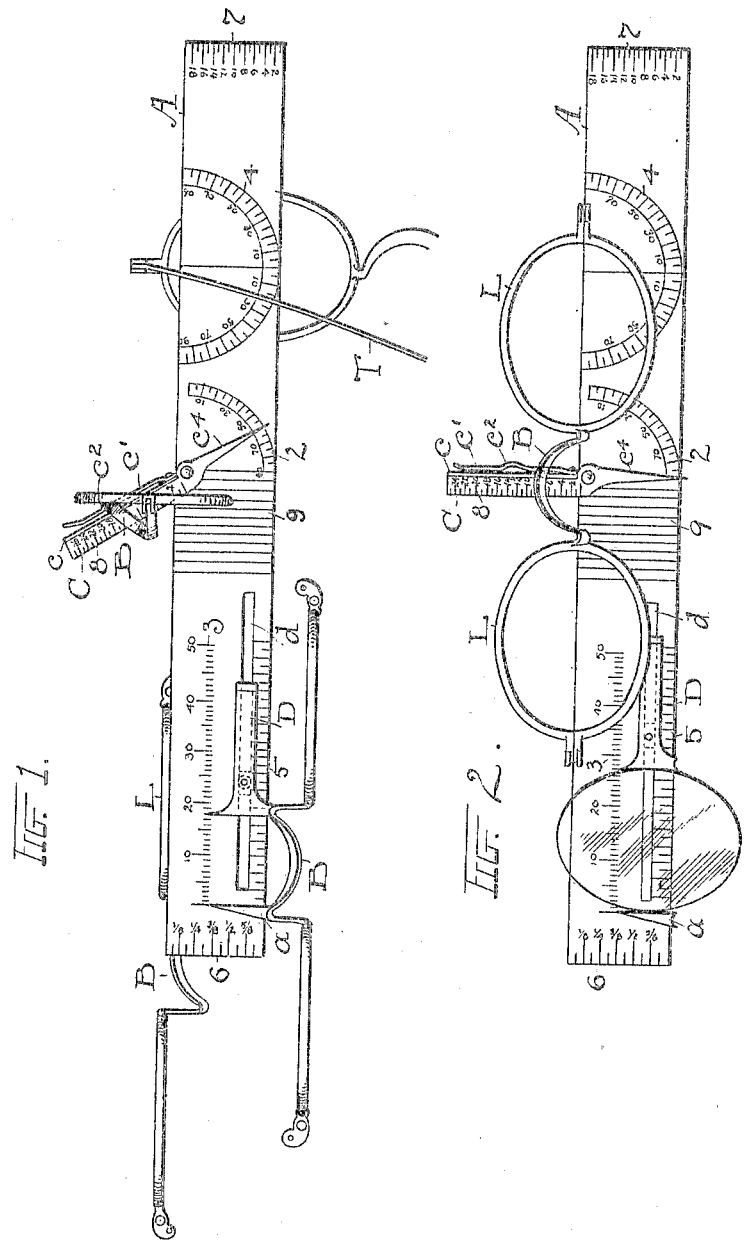

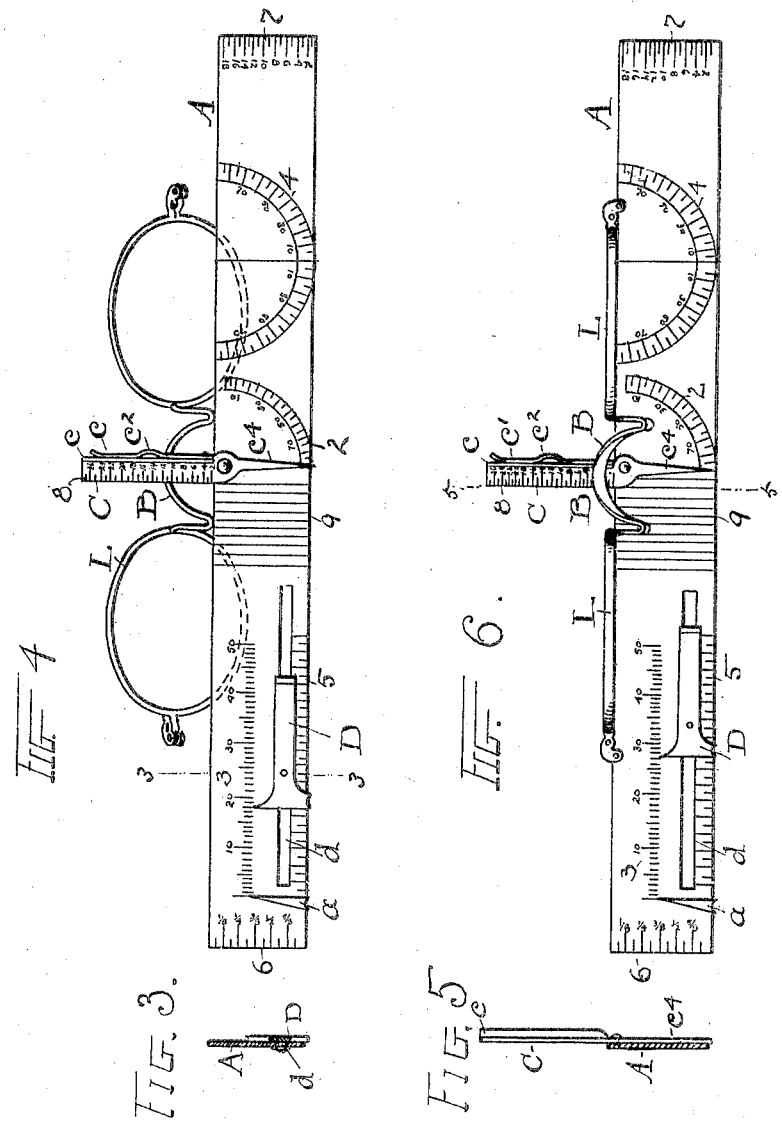

UNITED STATES PATENT OFFICE.

WILLIAM G. ALLARDT, OF CLEVELAND, OHIO.

OPTICIAN'S RULE.

SPECIFICATION forming part of Letters Patent No. 794,068, dated July 4, 1905.

Application filed November 16, 1904. Serial No. 232,946.

*To all whom it may concern:*

Be it known that I, WILLIAM G. ALLARDT, a citizen of the United States, residing at Cleveland, in the county of Cuyahoga and State of Ohio, have invented certain new and useful Improvements in Opticians' Rules; and I do declare that the following is a full, clear, and exact description of the invention, which will enable others skilled in the art to which it appertains to make and use the same.

My invention relates to opticians' rules; and the invention consists in a rule constructed and adapted to operate substantially as shown and described, and particularly pointed out in the claims.

In the accompanying drawings, Figures 1, 2, 4, and 6, respectively, are front full-face views of the rule with the movable parts thereon in different positions, according to the measurements to be made and all as hereinafter fully described. Fig. 3 is a cross-section on line 3 3, Fig. 1; and Fig. 5 is a cross-section on line 5 5, Fig. 6.

A represents the rule itself or the piece of sheet metal which constitutes the "rule," so-called, and without the attached or movable portions or parts thereon. Obviously in a true sense these parts are necessary to complete the article and make an operative device as to all or nearly all the uses of the rule; but for the purpose of this description the part A is considered as the rule, and C and D are separate parts or members thereon having separate functions and uses, as will presently appear.

Upon the face of the rule proper are variously-disposed scales or dials for taking different measurements in conjunction with index-finger C or slide D, as well as for certain other purposes independent of these movable members. Thus there is shown a segmental dial 2 in conjunction with the point or pointer of index-finger C, and a straight scale 3 in conjunction with the point of slide D, as well as a fractional scale 5 at the edge of the rule below the slot $d$, in which the slide D is movably confined, and there is also a segmental or semicircular dial 4 near the right end of the rule and scales 6 and 7 at or across the ends of the rule. All these scales and dials may be written wholly in inches and fractions thereof or wholly in millimeters or partly in both, as in this instance, and the idea of the rule is to adapt it more especially for use in measurements in or with what are known as "spectacles" rather than with nose-glasses, as such; but obviously any practical use may may be made of the rule and be within the invention.

The dial-finger or hand C is pivoted centrally near the upper edge of the rule comparatively near its own middle and has a pointer extremity below its pivot and has a scale 8 along its upper end, while a spring $c'$ is laid upon its right-angled edge $c$ and provided with a bend $c^2$ midway its length adapted to engage the bow B of the glasses or spectacles, as seen in Fig. 1, and hold the same firmly against the flanged edge of the said finger.

Now assuming, for example, that an optician has a prescription for glasses before him to be filled and a certain angle of bridge or nose-piece in respect to the plane of the lens be prescribed. In such case to obtain the desired angle the bridge is engaged on the finger C beneath spring $c'$ under bend $c^2$, where it is firmly held by the spring, while the pointer $c^4$ of the finger on the scale 2 tells exactly what its angle is, the lens in the meanwhile being shown to be in right relation to the rule by comparison with the plain relatively close parallel cross-lines 9 midway the length of the rule and near the pivot-point of finger C. Having found the angle of the bridge as it may be originally and seeing what the prescription calls for, the bridges can be easily bent to such desired angle in the usual way, and having been ascertained to be right the first requirement of the prescription is filled. The next measurement may be assumed to be the width of the bridge at its base to adapt it to the nose of the wearer, and there is much variance as to this single requirement because of the differences in the width of noses at this point. This is ascertained by means of slide D, working frictionally in slot $d$ lengthwise in the rule in conjunction with scale 3, and to get the measurement desired the base-points of the bridge are laid against the fixed straight-edged shoulder or stop $a$ on the rule and the straight measuring edge of slide D, as seen at the left in Fig. 1. The point of the slide D will tell when the right width is reached. A third test or measurement may be the exact relation of the crown of the bridge in respect to the lens, and it may be required to be forward of or near the same, as prescribed. This is ascertained by placing the lens or the rim L therefor flat upon the straight edge of the rule, as seen at left in Fig. 1, and determining the relation of the bridge therewith from the graduated scale 6 at the end of the rule. Either end of the rule can be used for this purpose. As shown, the bridge is back from or retired from the plane of the lens relatively as shown and presumably as prescribed. Another measurement and test is shown at the right in Fig. 1, by which the angle of the temple or ear wire T is adapted to be worked out, according to the width of the face to which it is to be applied. Here also there is much variance. This is done when widening is needed by filing down the temple or wire butt to suit the demand, and the exact angle desired is determined by placing the rim L flat against the back of the rule centrally behind scale 4 and sweeping the temple T over the said scale till the right angle is reached.

In Fig. 2 two distinct measurements are shown, including the height of the bridge on finger C and the width of a lens, by placing the same between slide D and the fixed stop $a$ and getting the right size on scale 3. In the case of the height of bridge the lens-rims are laid against the rule and brought in line with the top edge directly at their middle or center, and the bridge is laid against the finger C when in a right-angled position, as shown. This gives the relative height as respects the lens, but differs from what is known as the "depth" of the bridge, as disclosed in Fig. 4. In this latter measurement the bridge is set with its base-points directly upon the edge of the rule, and the elevation or depth is ascertained by the scale on finger C and only as between its own base and its crown or top. Then there is still another measurement shown in Fig. 6, by which the outward or out position of the crown of the bridge to or from the plane of the lens is determined and which is the reverse of what is seen at the top and left in Fig. 1, the finger C being used for this purpose also, while the lens-rims are laid flat upon the edge of the rule, as shown.

The entire rule, as thus shown and used, does not usually exceed seven inches in length by about one inch in width and is preferably, though not necessarily, fashioned out of some suitable sheet metal, such as aluminium, brass, or steel.

What I claim is—

1. As a new article of manufacture, an optical rule having an index-finger pivoted thereon between its ends and at one edge thereof, and a slide at one end of said rule adjustably engaged in a slot therein, and measuring-scales on the face of the rule associated with said finger and slide, substantially as described.

2. An optical rule and an index-finger pivoted between its ends at one edge thereof and provided with a pointer below its pivot overlying the face of the rule, and a dial on the rule over which said pointer is adapted to sweep, said finger provided with a measuring-scale on its upper portion and means to support eyeglasses across its edge, substantially as described.

3. In optical rules, a rule and a finger pivoted between its ends on the edge of the rule and provided with a measuring-scale running lengthwise on its upper portion and a spring on its edge to hold eyeglasses thereon, and an arc-shaped dial across the face of the rule overlapped by one end of the said finger, substantially as described.

4. In optical rules, a rule and a finger pivoted thereon having a pointer overlapping the side of the rule, means on the finger to removably secure a spectacle-frame and an index on the rule opposite said pointer and parallel cross-lines next to said index on the opposite side of the finger-pivot, substantially as described.

In testimony whereof I sign this specification, in the presence of two witnesses, October 19, 1904.

WILLIAM G. ALLARDT.

Witnesses:
   H. T. FISHER,
   R. B. MOSER.